US011848937B2

(12) United States Patent
Wolohan, Jr. et al.

(10) Patent No.: US 11,848,937 B2
(45) Date of Patent: Dec. 19, 2023

(54) SECURE COMMUNICATION USING BLOCKCHAIN TECHNOLOGY

(71) Applicant: Booz Allen Hamilton Inc., McLean, VA (US)

(72) Inventors: John T. Wolohan, Jr., McLean, VA (US); Steffen Michael Haaker, McLean, VA (US); Ryan Thomas Gentry, McLean, VA (US)

(73) Assignee: Booz Allen Hamilton Inc., McLean, VA (US)

( * ) Notice: Subject to any disclaimer, the term of this patent is extended or adjusted under 35 U.S.C. 154(b) by 114 days.

(21) Appl. No.: 17/025,835

(22) Filed: Sep. 18, 2020

(65) Prior Publication Data
US 2022/0094692 A1 Mar. 24, 2022

(51) Int. Cl.
*H04L 9/40* (2022.01)
*G06F 16/23* (2019.01)
*G06F 16/27* (2019.01)

(52) U.S. Cl.
CPC .......... *H04L 63/12* (2013.01); *G06F 16/2379* (2019.01); *G06F 16/27* (2019.01); *H04L 63/0428* (2013.01); *H04L 63/10* (2013.01)

(58) Field of Classification Search
CPC ..... H04L 63/12; H04L 63/0428; H04L 63/10; H04L 63/123; H04L 9/50; G06F 16/2379; G06F 16/27
See application file for complete search history.

(56) References Cited

U.S. PATENT DOCUMENTS

| | | | |
|---|---|---|---|
| 11,200,569 B1 * | 12/2021 | James | G06Q 20/381 |
| 11,334,883 B1 * | 5/2022 | Auerbach | G06Q 20/3829 |
| 2018/0129436 A1 * | 5/2018 | Standefer, III | G06F 3/0659 |
| 2018/0343307 A1 * | 11/2018 | Lotter | H04W 12/37 |
| 2019/0311153 A1 * | 10/2019 | Hollinger | G06F 16/955 |
| 2020/0214081 A1 * | 7/2020 | Spanton | G06F 16/1824 |
| 2020/0349569 A1 * | 11/2020 | Murao | G06Q 50/30 |
| 2021/0382620 A1 * | 12/2021 | Fang | H04L 9/3218 |
| 2022/0138734 A1 * | 5/2022 | Madisetti | G06Q 20/0655 705/44 |

FOREIGN PATENT DOCUMENTS

| | | | | |
|---|---|---|---|---|
| CN | 110536300 A | * | 12/2019 | ............ H04W 12/08 |
| CN | 111080443 A | * | 4/2020 | |
| CN | 111159307 A | * | 5/2020 | ............. G06F 16/27 |
| CN | 111401902 A | * | 7/2020 | ............ G06F 21/602 |

OTHER PUBLICATIONS

Adams, N., et. al. "Smart Contracts and Solidity", GitHub, downloaded from: https://github.com/ethereumbook/ethereumbook/blob/develop/07smart-contracts-solidity.asciidoc#intro_chapter on Sep. 18, 2020.

* cited by examiner

*Primary Examiner* — Michael R Vaughan
(74) *Attorney, Agent, or Firm* — Volpe Koenig (57) ABSTRACT

Techniques for secure communication is provided. The techniques include requesting first smart contract execution by one or more nodes of the communication system to determine permissions for communication; performing communication based on the requested permissions; and requesting second smart contract execution by one or more nodes of the communication system to verify information associated with the communication.

25 Claims, 7 Drawing Sheets

SECURE COMMUNICATION USING BLOCKCHAIN TECHNOLOGY

BACKGROUND

Communication security between electronic devices is a constant design consideration. Improvements to security are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for secure communication are provided. The techniques include requesting first smart contract execution by one or more nodes of the communication system to determine permissions for communication; performing communication based on the requested permissions; and requesting second smart contract execution by one or more nodes of the communication system to verify information associated with the communication.

Figure 1:
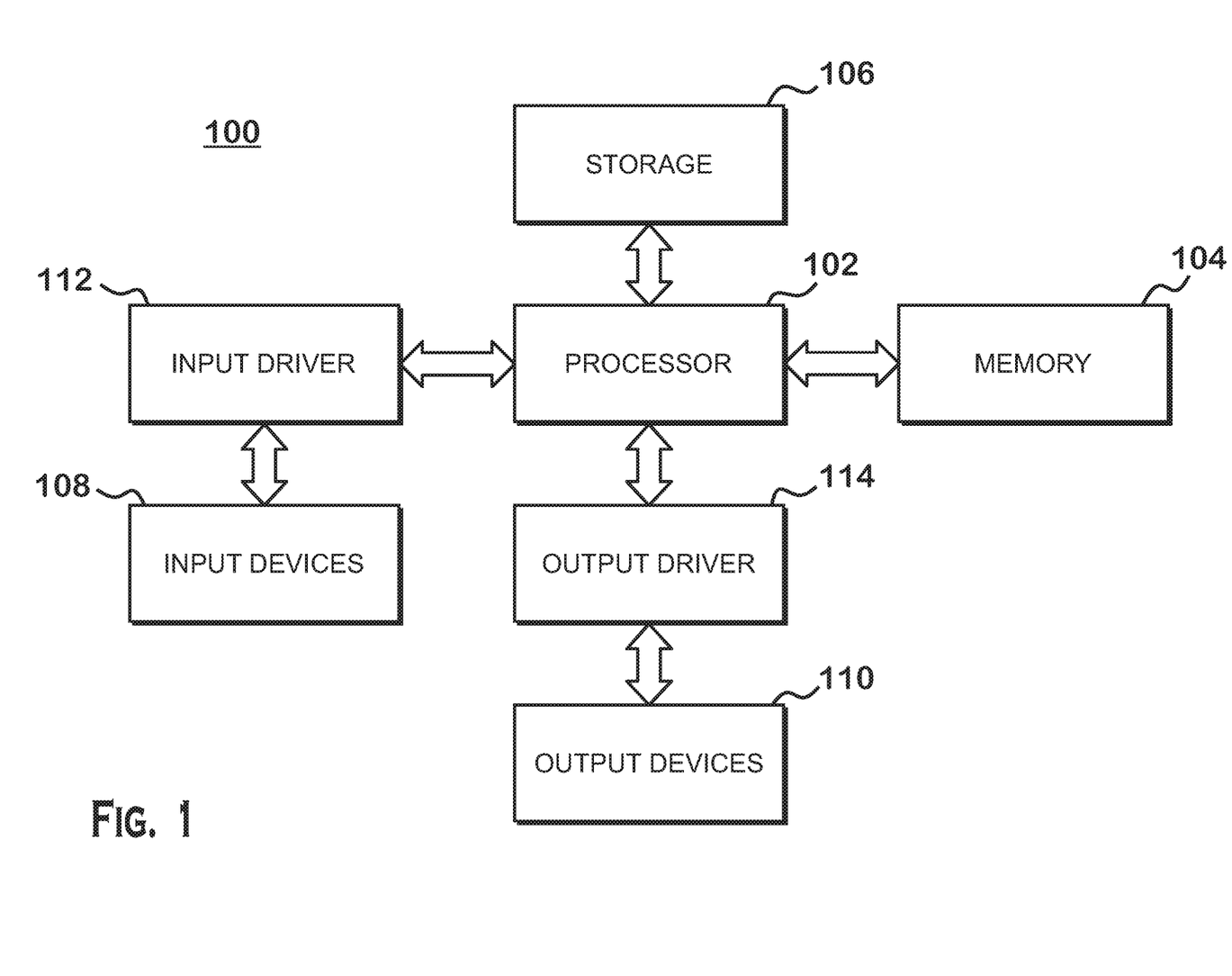
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
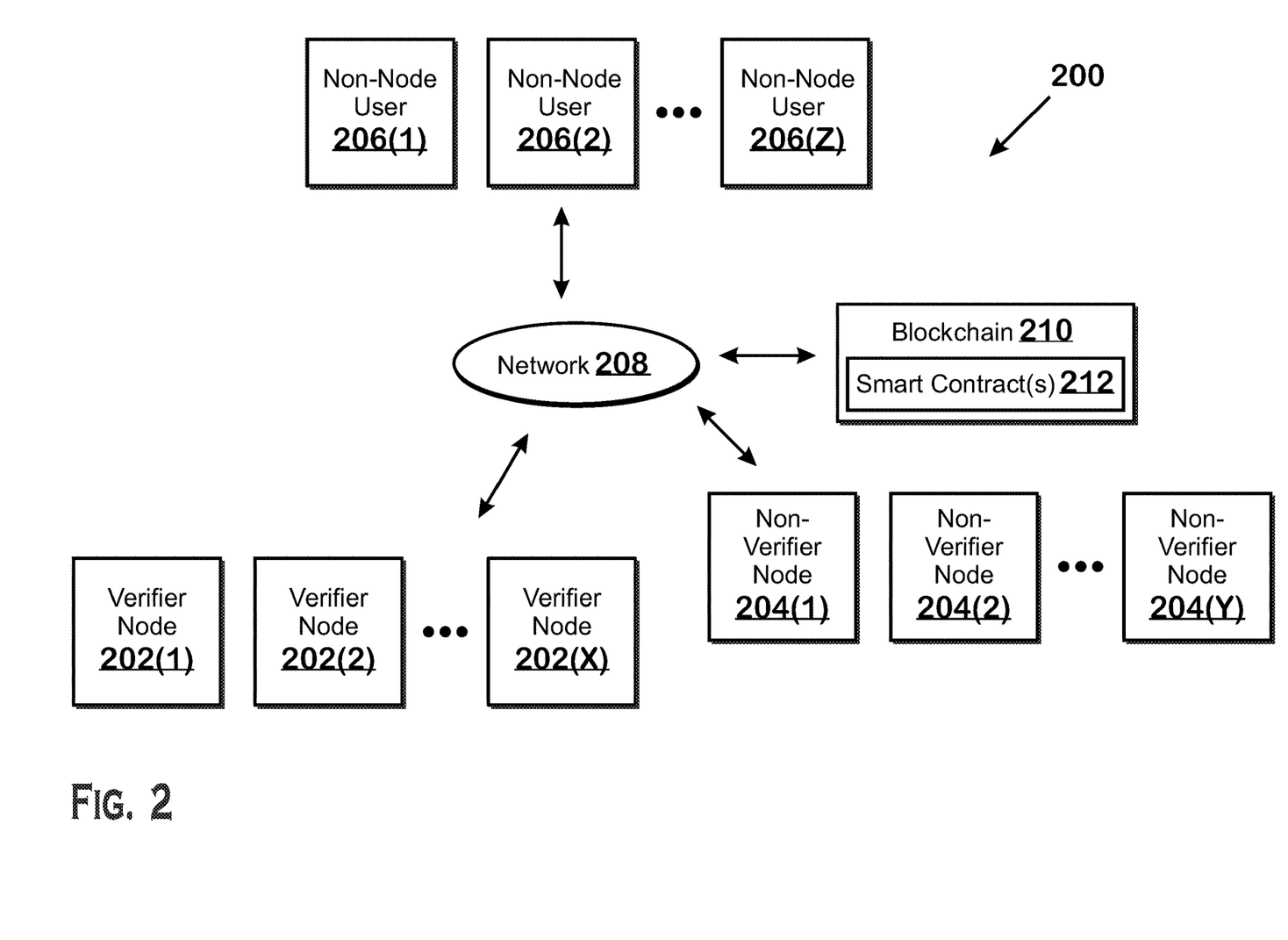
FIG. 2 is a block diagram of a blockchain based communication system, according to an example.

FIG. 2 is a block diagram of a blockchain based communication system 200, according to an example. The communication system 200 includes one or more verifier nodes 202, one or more non-verifier nodes 204, and one or more non-node users 206, all connected by a network 208. Each of the nodes, which include the verifier nodes 202 and the non-verifier nodes 204, are capable of executing smart contracts 212 of a blockchain 210.

The blockchain 210 is blockchain data and code ("smart contracts") stored in a distributed manner. More specifically, the blockchain 210 is data stored in any technically feasible manner, such as in a distributed manner across different nodes. In some examples, multiple copies of one or more different portions of the blockchain 210 are stored by one or more of the nodes.

The blockchain 210 includes one or more blockchain blocks. Each block includes one or both of blockchain data and smart contracts. Blockchain data is data of a type that is specified by the entity that initializes the blockchain or an entity that writes to the blockchain. An entity that initializes the blockchain is, in some implementations, a user performing such initialization through specific software. A smart contract 212 is executable code whose instructions are included within the blockchain 210 itself. In an example, the nodes execute a blockchain virtual machine. The smart contracts are encoded with instructions of the instruction set architecture of the blockchain virtual machine. Any node of the communication system 200 is capable of executing some or all of any smart contract. A node is a "user" that has one or more processors, such as the processor 102 of FIG. 1, capable of executing smart contracts 212. A user is a node (i.e., a verifier node 202 or a non-verifier node 204) or a non-node user 206. A user has a unique identifier, which, in some implementations, is a blockchain wallet. The unique identifier is, includes, or is associated with a unique communication security identifier. In some implementations, the unique communication security identifier is a public key/private key cryptographic pair. This pair allows for secure communications between users of the communication system 200 as well as unique identification of the user. In an example, a first user encrypts communications to be sent to one or more other users with the private key of the first user. Other users attempt decryption of such communications using the public key for the first user. If the decryption is successful (e.g., successfully results in recovery of a known value), then the other users are able to verify that the message originated with the user associated with the public key, i.e., the first user. The public/private key is used for both communications security and identity verification, since only communications encrypted with a particular private key can be decrypted with the corresponding public key.

As stated above, the blockchain 210 includes one or more blocks. Each block stores at least a portion of the blockchain data and/or at least a portion of a smart contract 212. Further, the blockchain 210 is a sequence (or "chain") of these blocks, with each block including metadata that is mathematically linked to at least one preceding block. In an example, each block includes a cryptographic hash of the preceding block. This metadata provides additional security for the contents of the blockchain, since modification of one portion of the blockchain would require modification of all other blocks of the blockchain, which is computationally expensive and also means that block content integrity is verifiable.

Figure 3:
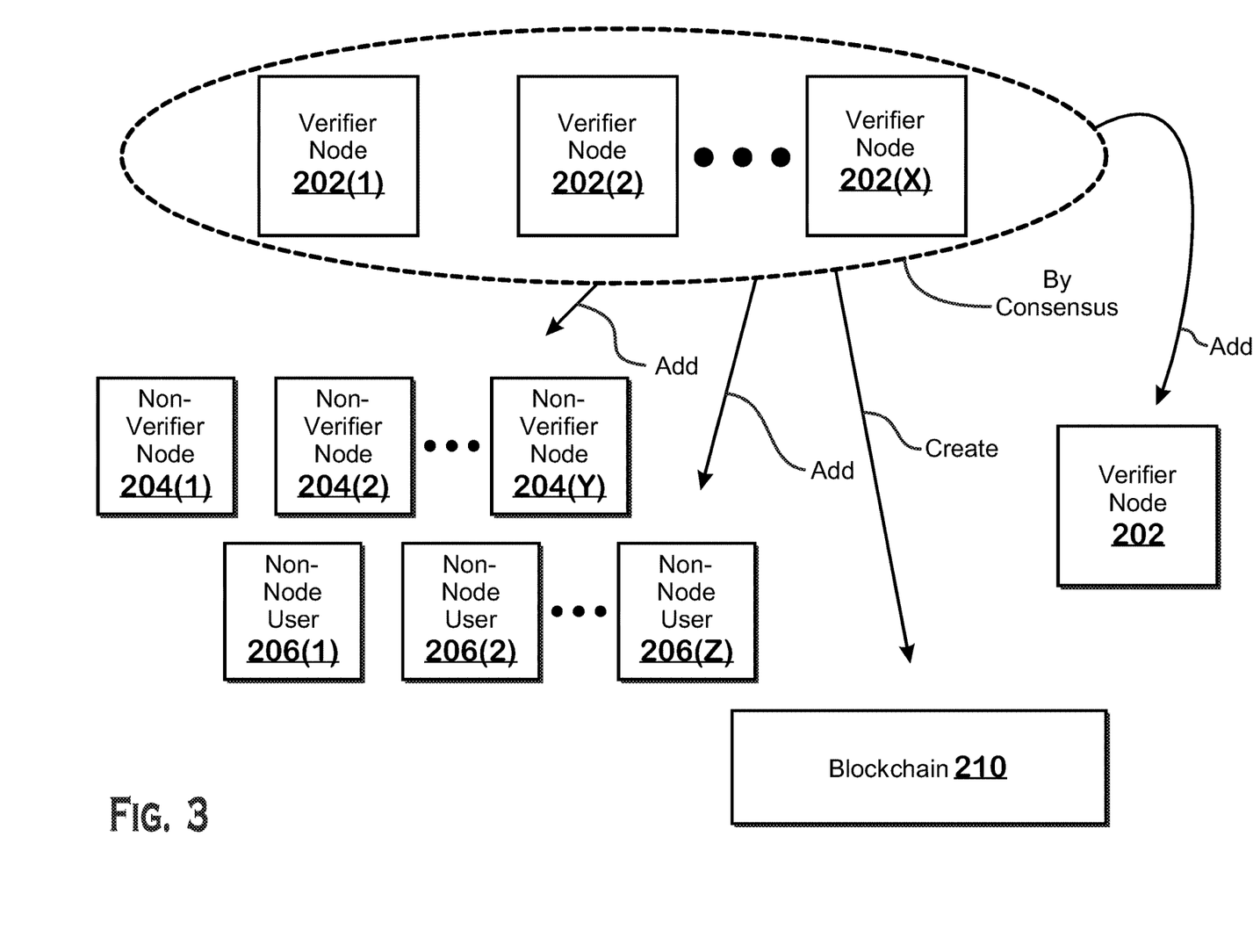
FIG. 3 is a diagram illustrating a proof of authority scheme, according to an example.

As stated above, any node, such as a verifier node 202 or a non-verifier node 204, is able to execute one or more smart contracts 212. In addition to being able to execute one or more smart contracts 212, the verifier node 202 is able to add additional verifier nodes 202, non-verifier nodes 204, or non-node users 206 to the communication system 200, through a proof of authority scheme, as illustrated in FIG. 3. The proof of authority scheme is a scheme to add an identification holder (i.e., a user) to the system 200 based on one or more items of data describing one or more aspects of identity of the identification holder. In some examples, an "identification holder" is an entity that has a unique identifier, such as a blockchain wallet. In the example in which blockchain wallets are or are identified by public and private keys, an identification holder has a unique public and private key. The identification holder or an entity acting on behalf of the identification holder (e.g., a human operator) provides information identifying the identification holder to one or more verifier nodes 202 and the one or more verifier nodes 202 determines whether the identification holder should be added to the system.

In some examples, the information identifying the identification holder includes the unique identifier (e.g., blockchain wallet). In some examples, the information identifying the identification holder additionally or alternatively includes other information uniquely identifying the identification holder. In some examples, this other information includes network address (e.g., internet protocol address), physical network address (e.g., media access control ("MAC") address), geographic information, an identifier of a device that is uniquely associated with the unique identifier (e.g., a bar code number appearing on the physical device itself, such as a device serial number, a device model number, or other type of device-identifying number), or some other identifying feature. In response to receiving the information identifying the identification holder, the one or more verifier nodes 202 verifies whether that identification holder is permitted to be added to the system 200. In the event that the one or more verifier nodes 202 verifies that a particular identification holder is permitted, the one or more verifier nodes 202 permits the identification holder to join the system. In the event that the one or more verifier nodes 202 does not verify that a particular identification holder is permitted, the one or more verifier nodes 202 does not permit the identification holder to join the system. The decision of whether to allow the identification holder to join the system is made by consensus, meaning that at least a certain proportion of the verifier nodes 202 (e.g., a half or two thirds) must agree that a particular identification holder is permitted to join the system 200. Joining the system means that the user is permitted to communicate with other users of the system.

In some examples, any particular verifier node 202 makes a decision regarding whether a particular identification holder is permitted to join the system 200 in any technically feasible manner. In one example, each verifier node 202 interfaces with a trusted network administrator software application which allows an administrator to add identification holders (specified by their identification information) to the system 200. The verifier nodes 202 check that a particular identification holder is included in a list of authorized identification holder and, if so, adds that identification holder to the network. In some implementations, the trusted network administrator software application allows for a selection of which category (e.g., verifier node 202 or non-verifier node 204) a particular identification holder is to be placed into. In another example of how to add users to the system 200, the verifier nodes 202 make an algorithmic determination of whether to add a specific identification holder to the system 200. In various examples, the algorithmic determination considers any one or more aspects of the identity of the identification holder, processing those one or more aspects as specified by software (such as a smart contract), and determines whether to add the identification holder to the system based on the results of that processing. In an example implementation, a human authenticator interfaces with a user interface of a trusted software application and adds one or more blockchain wallets (which, in this example, are the identification information for associated users) to the system as users but not as verifiers. As a result of this action, the verifier nodes 202 determine that those blockchain wallets are associated with authorized users and permit those wallets to be added as users.

In some implementations, the determination of whether a particular identification holder has permission to join the system 200 includes a determination of whether a particular identification holder should be added as a verifier node 202 or a user that is not a verifier (e.g., a non-verifier node 204 or non-node user 206). As described elsewhere herein, verifier nodes 202 have the capability to add additional users to the system, while non-verifier users (e.g., non-verifier nodes 204 or non-node users 206) do not have that capability. Similar to the above, in some implementations, a user specifies through a trusted software application whether any particular user is to be added to the system 200 as a verifier.

Figure 4:
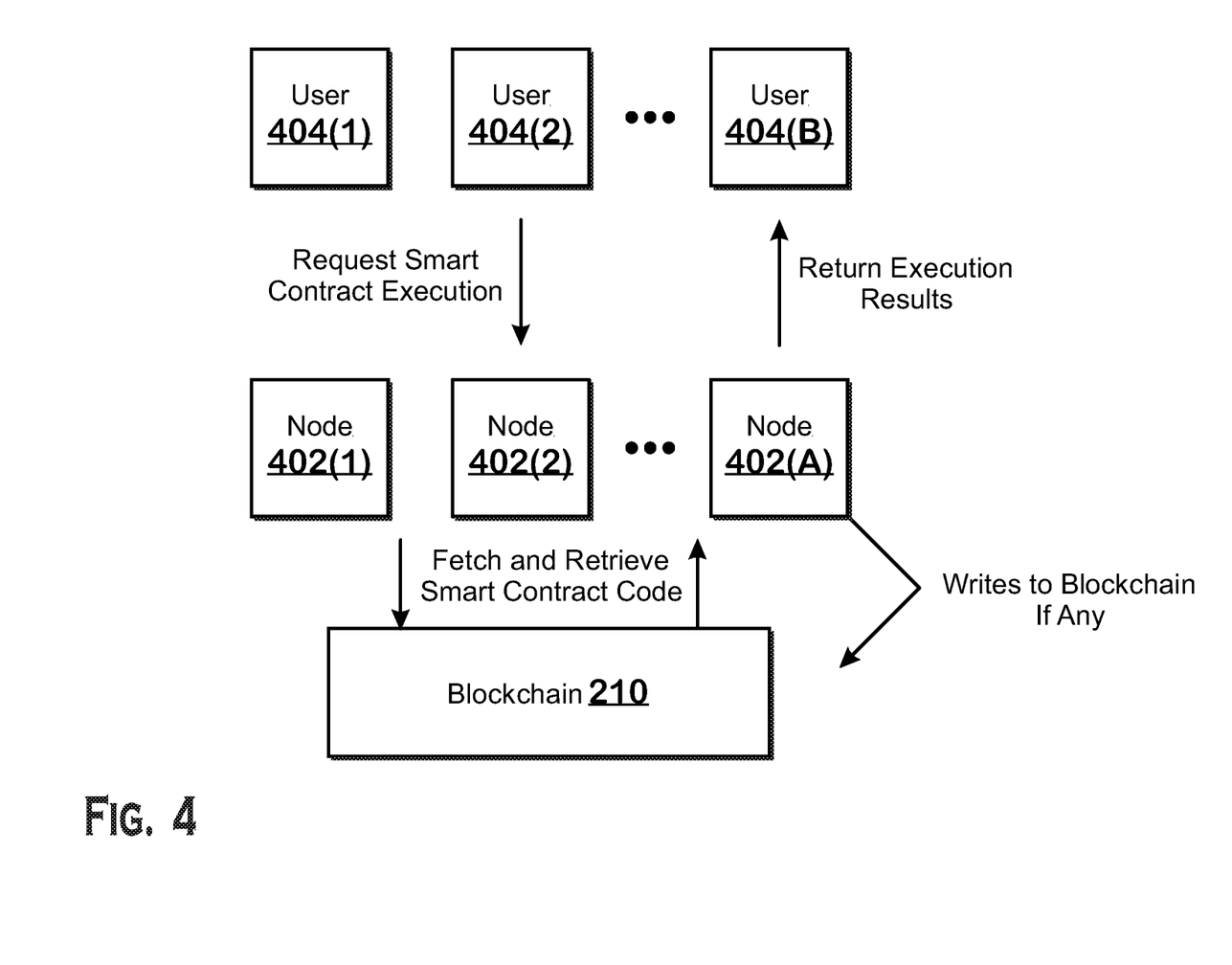
FIG. 4 is a block diagram illustrating operations for interfacing with the blockchain.

FIG. 4 is a block diagram illustrating operations for interfacing with the blockchain 210, according to an example. Regarding interfacing with the blockchain, any user 404 (that is, any non-node user 206, any non-verifier node 204, or any verifier node 202 that has been be authorized onto the system 200) is able to request a particular smart contract be executed by a node 402 (that is, a non-verifier node 204 or a verifier node 202). In response, any of the nodes 402 in the system 200 executes that smart contract and provides results back to the requestor. Execution of a smart contract sometimes results in additions to the blockchain 210. Additions to the blockchain 210 are performed once a consensus is reached. In other words, once a threshold number of nodes 402 agree that a particular edit is to be made to the blockchain 210, then all nodes 402 of the system 200 agree that that edit is to be made to the blockchain 210. Execution of a smart contract to provide results to a user 404 requesting such execution does not need to be done by a sufficient number of nodes 402 to reach consensus, except if such execution results in modification to the blockchain 210.

Figure 5A:
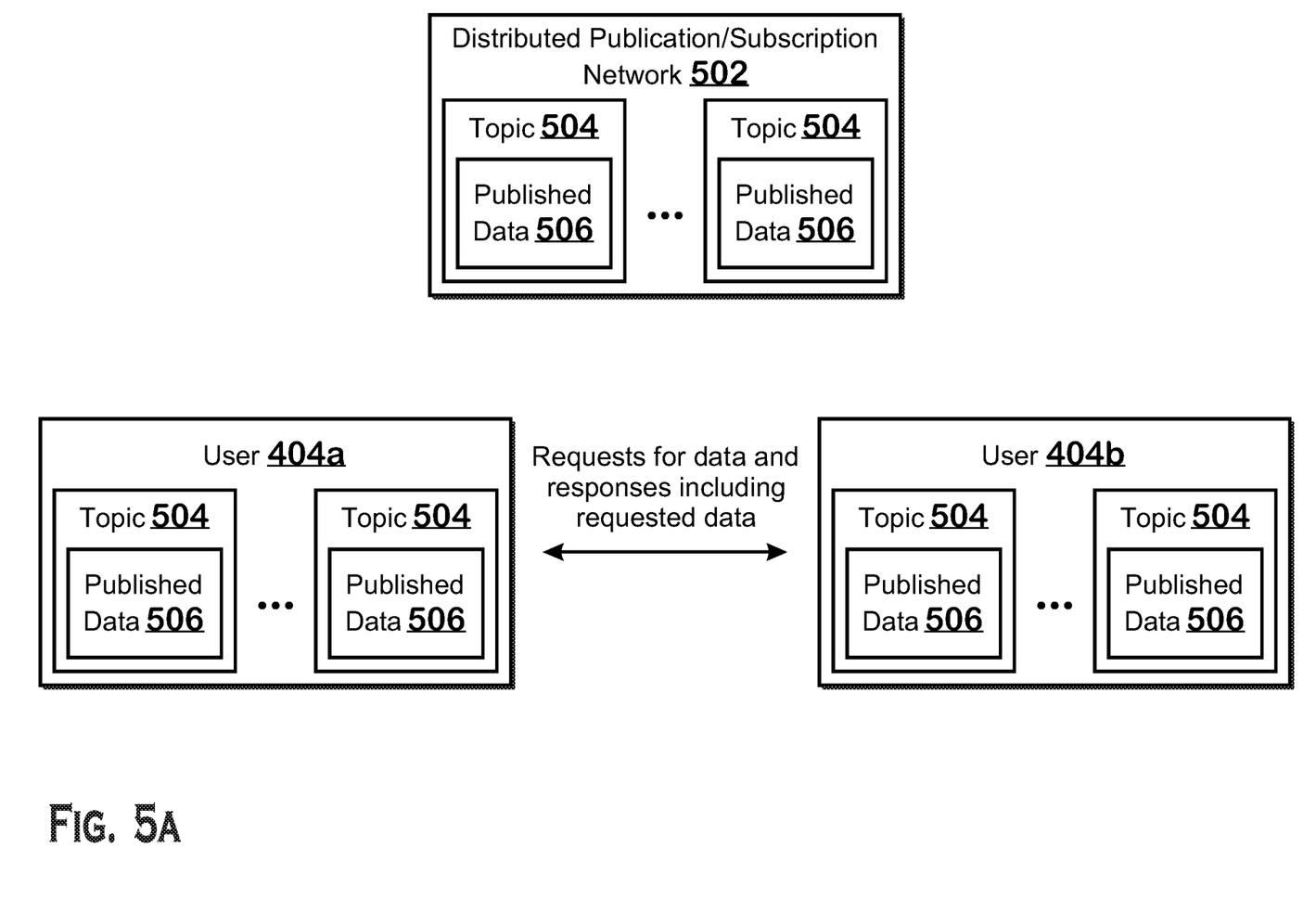
FIGS. 5A and 5B illustrate operations of a secure communication mechanism.
Figure 5B:
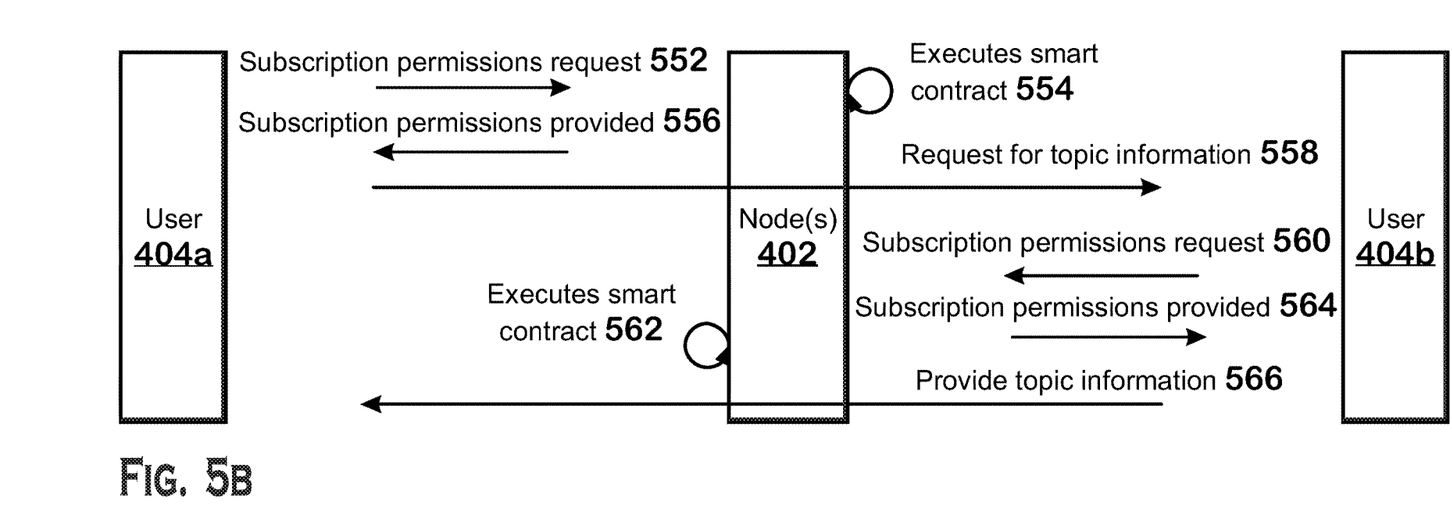

The system 200 allows for communications between users in a secure manner. Specifically, the smart contracts 212 executed by the nodes implement a secure communication mechanism. FIGS. 5A and 5B illustrate operations of this secure communication mechanism.

FIG. 5A illustrates a distributed publication/subscription network 502. In some implementations, the distributed publication/subscription network 502 is a decentralized network. The distributed publication subscription network 502 includes one or more topics 504, each having one or more items of published data 506. A topic is a category that a publisher can publish to. An item data is a piece of data indicated as being published to a topic. Subscribers to a topic are able to read all data published to that topic. Published data can be any data defined by a system. In an example, a set of smart lightbulbs is permitted to publish lightbulb status (e.g., on, off, or intensity) to a "lightbulb" topic. The distributed publication subscription network 502 is "distributed" in that the published data 506 is permitted to be stored on any storage or memory (e.g., storage 106 or memory 104 of FIG. 1) associated with any user 404 of the system 200, as shown. The users 404 request data and provide such data in response.

The communication of the topics 504 and published data 506 of the distributed publication/subscription network 502 does not occur directly via the blockchain-communication. However, the smart contracts 212 of the blockchain 210 are configured to manage permissions related to the distributed publication/subscription network 502. More specifically, users 404 request execution of the smart contracts 212 to obtain information indicating which topics 504 are viewable by a particular user 404, as well as to determine which users 404 have permission to publish to which topics 504. It should be understood that a user 404 requesting execution of a smart contract 212 means that the user 404 either executes the smart contract 212 if able (i.e., if the user 404 is a node) or transmits a request to one or more other users 404 in the system 200 to execute the smart contract. Those one or more users, themselves, either execute the smart contract, or transmit the request to different users 404. This process proceeds until the smart contract 212 is executed. The result of the smart contract execution includes indications of which topics 504 the user is able to view as well as which topics the user is able to publish to. In some examples, the user 404 is able to make finer granularity requests, such as asking only which topics 504 the user 404 can view or which topics the user can publish to.

FIG. 5B illustrates an example set of operations for communicating data between users 404. In the example, a first user 404a requests, from one or more nodes 402, an indication of which topics 504 the first user 404a is permitted to view (552). In other words, the first user 404a submits a subscription permissions request (552) to one or more nodes 402. In response, one or more nodes 402 executes an appropriate smart contract 212 (554) and provides the results (the subscription permissions) to the first user 404a (556). As described elsewhere herein, the instructions of the smart contract 212 are specified in the blockchain 210 itself. At step 558, the first user 404a then requests from a second user 404b the information belonging to a particular topic 504 returned from the one or more nodes 402 at step 556. At step 560, the second user 404b requests the one or more nodes 402 to inform the second user 404b regarding whether the first user 404a is permitted to view the topic requested by that user 404. In other words, the second user 404b submits a subscription permissions request (560) to one or more nodes 402 regarding the permissions of the first user 404a. In response, at step 562, the one or more nodes 402 executes a smart contract 562 and responds to the second user 404b, at step 564, with the requested permissions. In the example, these permissions indicate that the first user 404 is permitted to view the requested topic. Thus, at step 566, the second user 404b provides the information from the requested topic to the first user 404a.

It should be understood that the specific transactions illustrated in FIG. 5B represent an example set of transactions. In various implementations or modes of operation, a user 404 does not need to request permissions to view messages for a topic for each time that user 404 wants to view such messages. In some implementations, users 404 request discovery of topics, rather than permissions to view topics. The result of execution of a smart contract 212 to discover topics for a user 404 is a list of topics that the user 404 is permitted to view. In some implementations, the user 404 that is to respond to a request for topic information (558) does not check whether the requesting user 404 is permitted to access the requested topic (steps 560-564), and assumes that if a user 404 knows about a topic, the user is permitted to access the requested topic.

It should be understood that, in some implementations, the request for topic information 558 and providing of the topic information 566 between users 404 are not, themselves, performed using the blockchain 210 (i.e., by executing smart contracts 212 encoded into the blockchain 210) but instead occur directly. The protection that the blockchain 210 provides is that a user 404 that is not authorized to view a particular topic is not permitted to learn that that topic exists. Another protection offered by the blockchain 210 is that users 404 who would provide an unauthorized user with information for a particular topic learns that the requesting user is not authorized to receive such information, when the second user 404b requests execution of the appropriate smart contract 212 (steps 560-564). Although the communication between users 404 of topic information does not, itself, occur via the blockchain 210 smart contracts 212, such communication is, in some implementations protected through other means such as encryption using the wallet information of the users 404. An example means for ensuring data verification is described with respect to FIG. 5C.

Although FIG. 5B illustrates verifying permission to request access to a particular topic 504 via a smart contract 212, it should be understood that in other modes of operation, a similar technique is used to verify permission to publish to a particular topic. In an example, a first user 404a requests and receives topic information from a second user 404b. The topic information includes an indication of which user 404 originally published that information to that topic. The first, or requesting, user 404a requests a node 402 to execute a smart contract 212 to determine whether the second, or publishing, user 404b actually has permission to publish to that topic.

It should also be understood that the actors in FIG. 5B represent entities from a distributed system. For example, it is possible that the first user 404a requesting information for a particular topic 540 is not able to directly communicate with the second user 404b that actually has the information for that topic 504. The communication between a user 404 requesting information and a user 404 who actually stores this information is able to go through other users 404 as intermediaries.

Similarly, it is possible for either the user 404 requesting topic information or a user 404 providing such information in response, or both, to not be in direct contact with any nodes 402. In such a situation, requests to execute smart contracts 212 and responses would be communicated through intermediaries.

It should be understood that any smart contract execution 212 that results in a modification to the blockchain 210 is executed by a sufficient number of nodes 402 to make a consensus. Any result from smart contract execution may result in a modification to the blockchain 210.

Although FIG. 5B shows users 404 as requestors and providers of information and nodes 402 as the entity that executes smart contracts 212, it should be understood that any of the users 404 that request or provide topic information could, themselves, be nodes 402. Thus, a user 404 that is a node 402 that requests topic information could execute its own smart contract 212 to determine whether that user 404 has permissions to view the topic. For security, smart contracts 212 that mediate access to the distributed publication/subscription service add at least some information to the blockchain 210, so that a consensus of nodes 402 needs to execute that smart contract 212 and achieve the same result. In an example, an indication of which user 404 asked for topic discovery, as well as which topics were provided, is written to the blockchain 210 so that the results of such smart contract 212 execution can be verified.

Figure 5C:
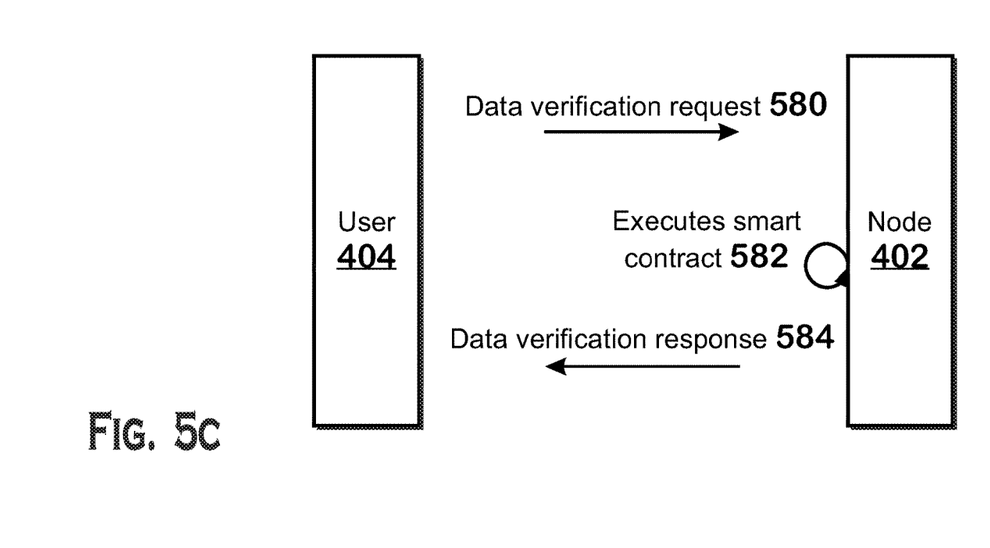
FIG. 5C illustrates an example means for ensuring data verification.

FIG. 5C illustrates a technique for verifying data received by a user 404, according to an example. According to the technique, a user 404 has received data for a topic already and attempts to verify the integrity of the data received. The user 404 has also received a verification signature. In an example, the verification signature is a hash of the data received as the contents published to a requested topic (or is the result of some other function applied to the data received). At step 580, the user 404 requests execution of a smart contract 212 to verify data integrity, providing both the data and the verification signature. The node 402 executes a smart contract 582 to verify the data. In an example, this execution involves performing a verification function (e.g., a hash) to obtain a verification signature for the data provided and comparing the generated verification signature with the one received at step 580. In response to executing the smart contract 212, the node 402 provides the data verification response 584 to the user 404. If the generated verification signature matches the received verification signature, then the data is determined to be verified and if there is no match, then it is determined that the data is not verified.

As with the flow of FIG. 5B, in some examples, the user 404 is itself a node 402. In addition, it is not necessary for a user 404 to be directly connected to a node 402.

Figure 6:
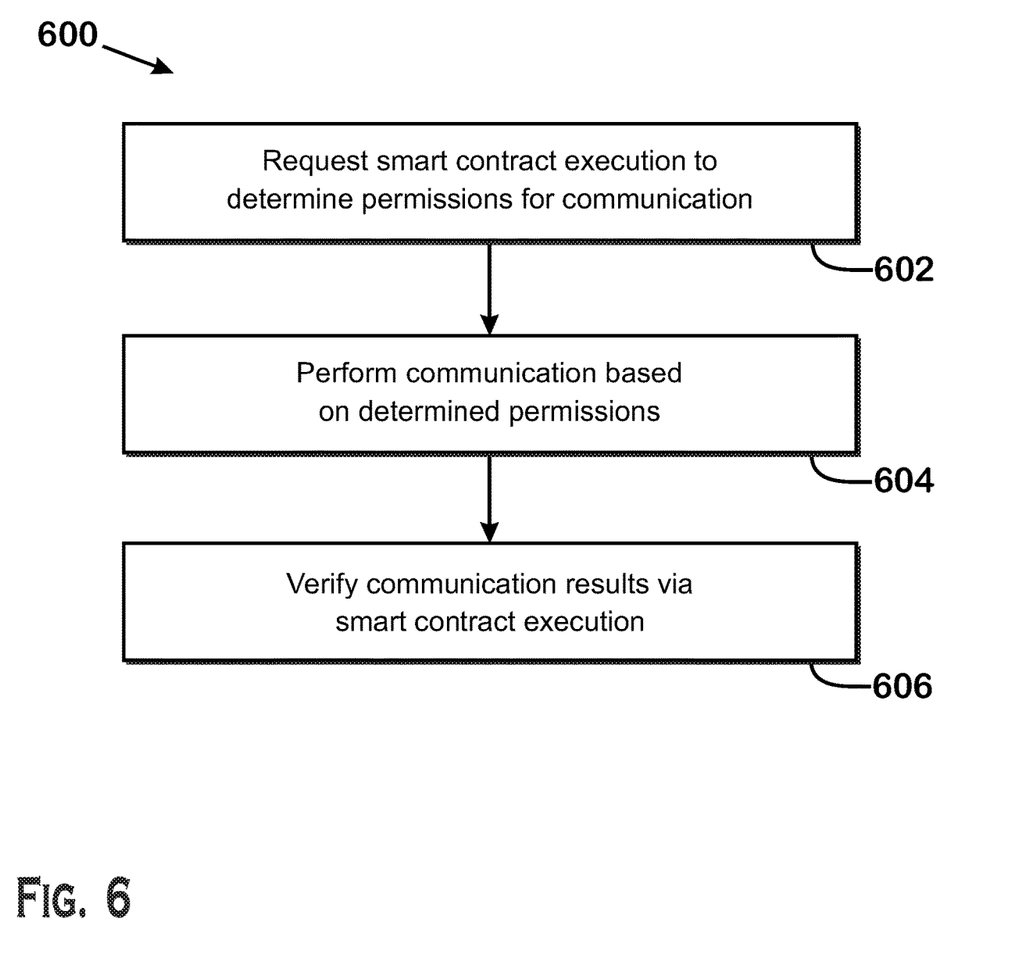
FIG. 6 is a flow diagram of a method for communicating securely, according to an example.

FIG. 6 is a flow diagram of a method 600 for communicating securely, according to an example. Although described with respect to the system of FIGS. 1-5C, any system configured to perform the steps of the method 600 in any technically feasible order falls within the scope of the present disclosure.

The method 600 begins at step 602, where a user 404 requests execution of a smart contract 212 to determine permissions for communication. In general, these permissions include which users 404 are permitted to write or read which communications. In the example where communication occurs via a publication-subscription system, permissions include whether a user 404 is permitted to publish to a particular topic and/or whether a user 404 is permitted to read from a particular topic. As described elsewhere herein, the topics include individual communications to be read by users 404. The execution occurs and the node that executes the smart contract 212 provides the results back to the user 402.

At step 604, the user 404 performs communication based on the requested permissions. In the situation where the user 404 is requesting permissions to read data (e.g., requesting discovery of topics—which topics the user 404 has permissions to read, or requesting whether data is readable in another manner), the user receives the read permission information in step 602 and performs the read in accordance with those permissions. In an example, the user 404 reads from a topic that the user is permitted to read from. In the situation where the user 404 is requesting permissions to write data, the user 404 writes data in the manner permitted as specified in the communication received in step 602. In an example, the user 404 learns in step 602 that the user 404 is permitted to publish to a particular topic and therefore does so.

In some situations, multiple users 404 involved in a transaction as counter-parties (e.g., where a first user 404a provides requested data to a second user 404b that requested that data) each request permissions involved in that transaction. For example, a first user 404a wishes to read data from a particular topic. The first user 404a requests permissions to read from that topic and, once permission is obtained, attempts to access data stored by another user 404b. That second user 404b also requests permissions regarding whether the first user 404a is permitted to read from that topic. Similarly, in an example where data is written, a first user 404a requests permissions to write to a particular topic and, a second user 404b that wishes to read that topic requests permission information indicating that the first user 404a is permitted to write to that topic.

At step 606, a user 404 requests performance of a verification operation to verify data involved in a communication. In an example, the user 404 receives data and a signature, and requests verification of the data and signature. A node 402 executes a smart contract 212 with the data and signature. The node 402 performs a signature operation on the data and compares a resulting signature with the received signature. If the signatures match, the node 402 informs the user 404 that the data is verified. If the signatures do not match, the node 402 informs the user 04 that the data is not verified.

In some implementations or situations, step 606 is optional. In such situations, a user 404 just requests permissions to access certain data, a node 402 executes one or more smart contracts 212 to determine whether the user 402 is permitted to perform the requested actions, the node 402 returns that permissions information to the user 402, and the user 402 acts in accordance with those permissions.

An example of a blockchain system is now described. This example system is embodied as a fleet of autonomous vehicles. At least some of these autonomous vehicles are non-verifier nodes 204. In some implementations, each autonomous vehicle is a non-verifier node 204, while in other implementations, some but not all vehicles are non-verifier nodes 204, with the other vehicles being non-node users 206.

To set up the system, the vehicles are each provided with unique identifiers, such as blockchain wallets. An administrator such as the manufacturer or fleet controller (e.g., a company that owns or operates the fleet) uses a software interface to add each of the vehicles to the blockchain system. The administrator also uses the software interface to indicate publication/subscription permissions for each of the vehicles. In an example, the administrator indicates that the distributed publication/subscription network 502 includes one topic for each vehicle, that each vehicle is permitted to publish to the topic assigned to that vehicle but not to any other topic, and that any vehicle is permitted to subscribe to the topic for any other vehicle. The information regarding the topics that exist, the permissions for the topics, and which users are in the system is stored in any technically feasible manner, such as within the blockchain itself, external to the blockchain, or partially within the blockchain and partially external to the blockchain.

During operation, each vehicle publishes information regarding that vehicle to the corresponding topic. Some such information includes vehicle location information, speed, and other status information. In the event that a vehicle wishes to obtain information about other vehicles, the vehicle requests that a node 402 perform a smart contract to return subscription permission for that vehicle. Any node 402, such as the vehicle itself and/or other vehicles, executes that smart contract and provides the subscription permission to the vehicle. In an example, this information indicates that the vehicle is permitted to subscribe to any other vehicle. The vehicle then requests, from a second vehicle (which can be a vehicle that is a node 402 or a vehicle that is not a node 402), published data 506 for a third vehicle. The second vehicle requests a node 402 (which can be any other vehicle) to execute a smart contract to verify that the requesting vehicle has permission to view the published data 506 for the third vehicle. The node 402 executes the smart contract and provides the result, indicating that the first vehicle is permitted to view the published data 506 for the third vehicle to the second vehicle. The second vehicle then retrieves the published data. If the second vehicle stores all requested data, the second vehicle provides that data to the first vehicle. If the second vehicle does not store all requested data, then the second vehicle requests a different vehicle to provide the information requested. The network of vehicles routes such request traffic through different vehicles until the request is finally satisfied. The one or more vehicles that have the request data return that data to the original requestor through the network of vehicles. In some implementations, each vehicle checks (via a smart contract) whether the original requestor is permitted to view the requested data, while in other implementations, only one or a limited number of vehicles makes this check. At some point after receiving requested data, the first vehicle requests data verification for the obtained data (FIG. 5C).

The term "user device" is sometimes used herein and refers to a device acting as or on behalf of a particular user identification. In an example, a particular user device is a device acting within the system 200 as an entity identified by a particular blockchain wallet.

It should be understood that although a distributed publication/subscription model has been described as a means for sharing data, the teachings of the present disclosure could be adapted for any data sharing system. In general, such a system would be a system in which users 404 are added to the system via verifier nodes. In addition, the users 404 request permissions to read from or write to other users 404 or to or from data entities (e.g., topics) that could be read from or written to by other users. In addition, the users 404 are able to perform verification of data received. Each of the above features are performed by smart contracts 212 executed by nodes 402 of the system as described elsewhere herein.

Any of the entities described, including users 404 and nodes 402, are embodied as software executing on a processor, hardware circuitry for configured to perform the functionality described herein, or a combination thereof. In an example, the nodes 402 are computing devices such as the device 100 of FIG. 1, having sufficient executing power to execute smart contracts 212. In some examples, some users 404 are assigned to devices that have relatively simpler processing abilities. Some examples include smart home devices such as smart lightbulbs.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, and the nodes 402, as well as the devices associated with non-node users 206) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for communicating via a communication system, the method comprising:
   requesting, by a first user device, that a first set of one or more nodes of the communication system executes a first smart contract to determine permissions for communication, wherein the permissions indicate how the first user device is permitted to communicate via a distributed publication/subscription network, including which categories of the publication/subscription network the first user device is allowed to view and which categories of the publication/subscription network the first user device is allowed to publish to;
   performing communication by the first user device on the distributed publication/subscription network based on the permissions, the communication including requesting information, from a second user device, for a topic permitted to be requested according to the permissions;
   requesting, by the second user device, that a second set of one or more nodes of the communication system execute the first smart contract to confirm that the topic is permitted to be requested by the first user device according to the permissions;
in response to the confirming, providing the requested information by the second user device to the first user device; and
requesting, by the first user device, a third set of one or more nodes of the communication system to execute a second smart contract to verify information associated with the communication.

2. The method of claim 1, wherein the first smart contract and the second smart contract comprise instructions included within a blockchain managed by a fourth set of one or more of the nodes of the communication system.

3. The method of claim 2, wherein:
the blockchain comprises a set of one or more blocks storing one or both of data and instructions, where at least one block of the blockchain includes a signature related to contents of at least one other block of the blockchain.

4. The method of claim 1, wherein the first set of one or more nodes comprise computing devices configured to execute smart contracts of a blockchain.

5. The method of claim 1, wherein the communication system includes user devices, where each user device is associated with a unique identifier.

6. The method of claim 1, wherein performing communication comprises publishing a data item to a topic of a publication-subscription communication system.

7. The method of claim 6, wherein executing the first smart contract comprises determining whether a first user is permitted to publish the data item to the topic.

8. The method of claim 1, wherein performing communication comprises obtaining a data item from a topic of a publication-subscription communication system.

9. The method of claim 8, wherein executing the first smart contract comprises determining whether a first user is permitted to subscribe to the topic.

10. A node device, comprising:
a memory storing instructions, and
a processor configured to execute the instructions to:
receive, from a first user device, a request for execution of a first smart contract to determine permissions for communication by the first user device, wherein the permissions indicate how the first user device is permitted to communicate via a distributed publication/subscription network, including which categories of the publication/subscription network the first user device is allowed to view and which categories of the publication/subscription network the first user device is allowed to publish to;
transmit, to the first user device, a result of execution of the first smart contract indicating how to perform communication based on the permissions, the communication including requesting information, from a second user device, for a topic permitted to be requested according to the permissions;
receive a second request from a second user device to confirm the permissions and executing the smart contract a second time to confirm that the topic is permitted to be requested by the first user device according to the permissions;
transmit, to the second user device, a result of executing the contract the second time; and
receiving, from the first user device, a request for execution of a second smart contract to verify information associated with the communication.

11. The node device of claim 10, wherein the first smart contract and the second smart contract comprise instructions included within a blockchain managed by nodes of a communication network.

12. The node device of claim 11, wherein the blockchain comprises a set of one or more blocks storing one or both of data and instructions, where at least one block of the blockchain includes a signature related to contents of at least one other block of the blockchain.

13. The node device of claim 10, wherein the user device is configured to perform communication based on the permissions by publishing a data item to a topic of a publication-subscription communication system.

14. The node device of claim 13, wherein executing the first smart contract comprises determining whether the user device is permitted to publish the data item to the topic.

15. The node device of claim 10, wherein the user device is configured to perform communication based on the permissions by obtaining a data item from a topic of a publication-subscription communication system.

16. The node device of claim 15, wherein executing the first smart contract comprises determining whether the user device is permitted to subscribe to the topic.

17. A network of user devices configured to communicate with a communication system, the network comprising:
a first user device and a second user device, wherein the first user device is configured to:
request, for the first user device, that a first set of one or more nodes execute a first smart contract to determine permissions for communication, wherein the permissions indicate how the first user device is permitted to communicate via a distributed publication/subscription network, including which categories of the publication/subscription network the first user device is allowed to view and which categories of the publication/subscription network the first user device is allowed to publish to; and
perform communication by the first user device on the distributed publication/subscription network, based on the permissions, the communication including requesting information, from a second user device, for a topic permitted to be requested according to the permissions; and
the second user device configured to request that a second set of one or more nodes of the communication system to execute the first smart contract to confirm that the topic is permitted to be requested by the first user device according to the permissions and in response to the confirming, provide the requested information by the second user device to the first user device,
wherein the first user device is further configured to request execution of a second smart contract by a third set of one or more nodes of the communication system to verify information associated with the communication.

18. The network of user devices of claim 17, wherein the first smart contract and the second smart contract comprise instructions included within a blockchain managed by nodes of a communication network.

19. The network of user devices of claim 18, wherein the blockchain comprises a set of one or more blocks storing one or both of data and instructions, where at least one block of the blockchain includes a signature related to contents of at least one other block of the blockchain.

20. The network of user devices of claim 17, wherein the first set of one or more nodes comprise computing devices configured to execute smart contracts of a blockchain.

21. The network of user devices of claim 17, wherein the communication system includes user devices, where each user device is associated with a unique identifier.

22. The network of user devices of claim 17, wherein the first user device is configured to perform communication by publishing a data item to a topic of a publication-subscription communication system.

23. The network of user devices of claim 22, wherein the first set of one or more nodes are configured to execute the first smart contract by determining whether the user device is permitted to publish the data item to the topic.

24. The network of user devices of claim 17, wherein the first user device is configured to perform communication by obtaining a data item from a topic of a publication-subscription communication system.

25. The network of user devices of claim 24, wherein the first set of one or more nodes are configured to execute the first smart contract by determining whether the user device is permitted to subscribe to the topic.

* * * * *